Dec. 2, 1924.	1,517,923
A. J. SYLVESTER
DISPENSING AND MEASURING APPARATUS
Filed Feb. 9, 1924    3 Sheets-Sheet 1
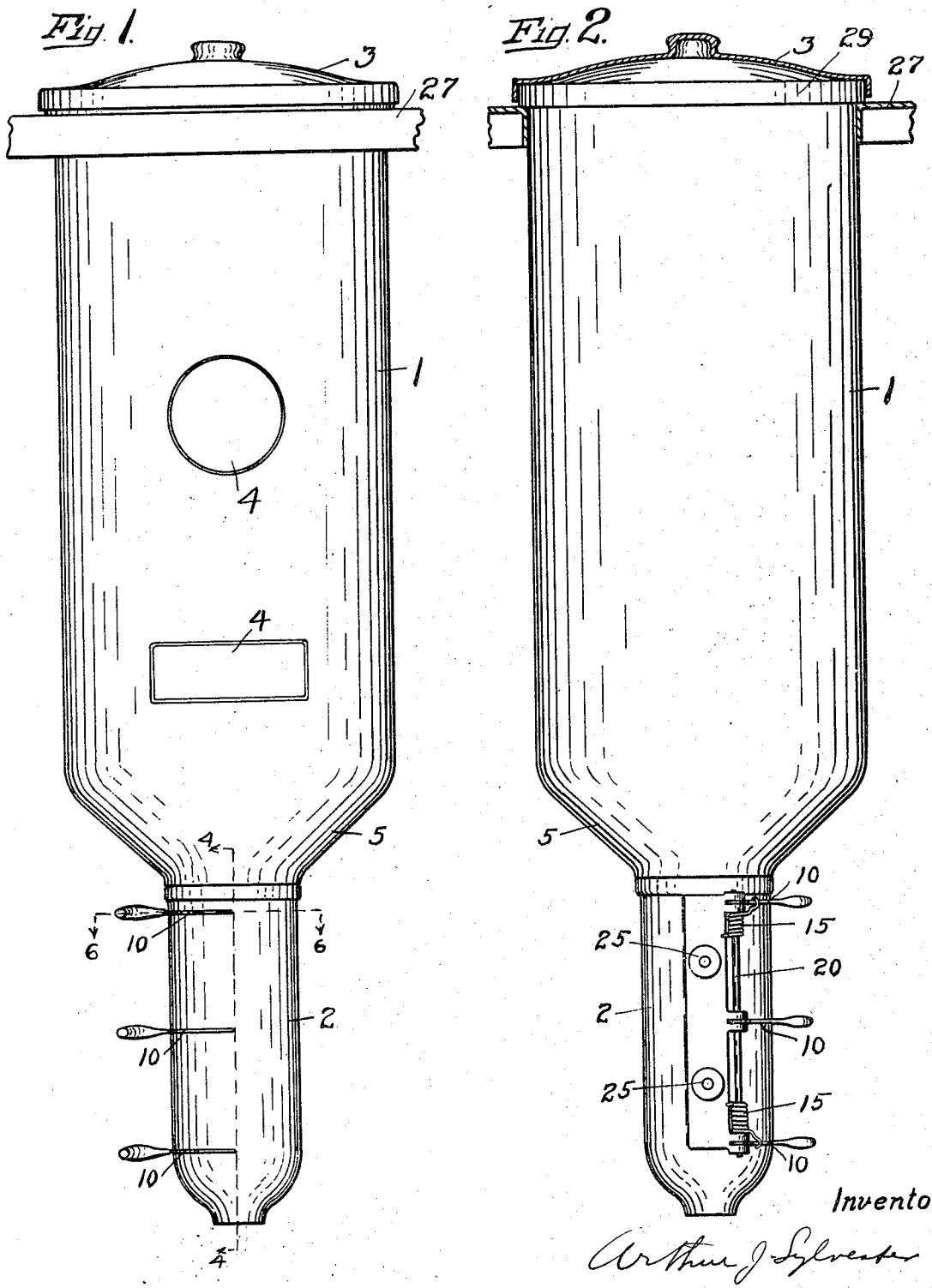
Inventor:
Arthur J Sylvester
By
Attorney.

Dec. 2, 1924. 1,517,923
A. J. SYLVESTER
DISPENSING AND MEASURING APPARATUS
Filed Feb. 9, 1924    3 Sheets-Sheet 2
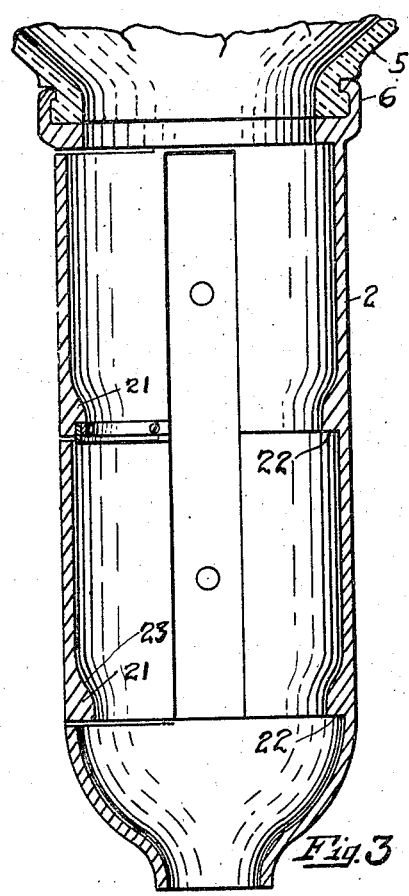
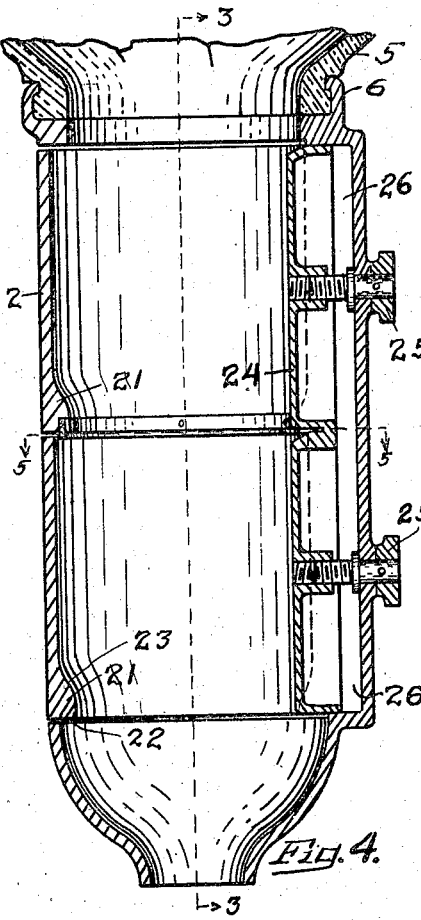
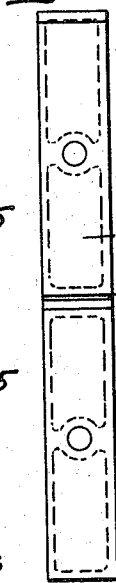
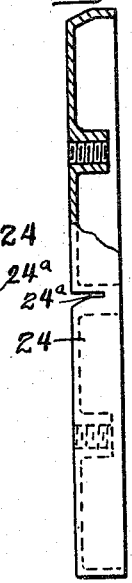
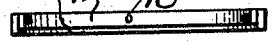
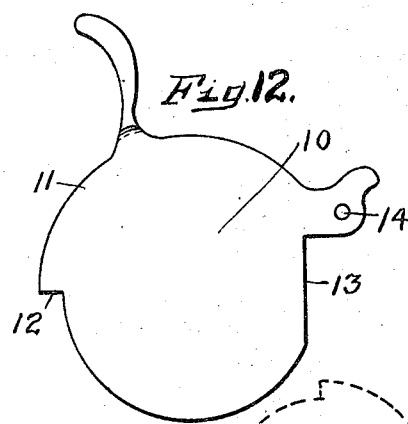
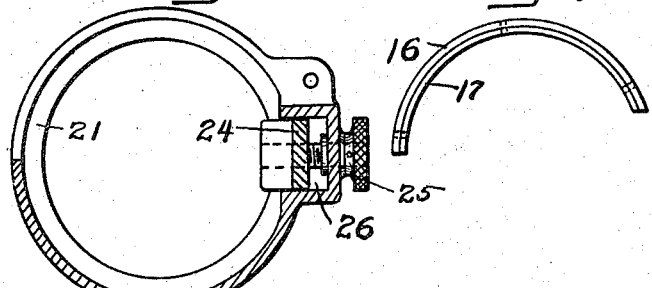
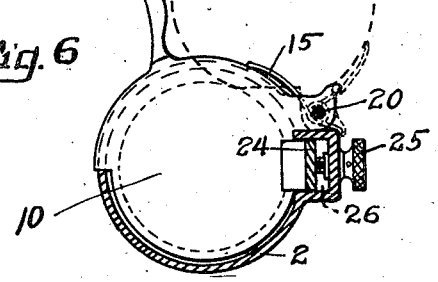
Inventor:
Arthur J. Sylvester
By N. J. Bissing
Attorney.

Dec. 2, 1924. 1,517,923
A. J. SYLVESTER
DISPENSING AND MEASURING APPARATUS
Filed Feb. 9, 1924   3 Sheets-Sheet 3
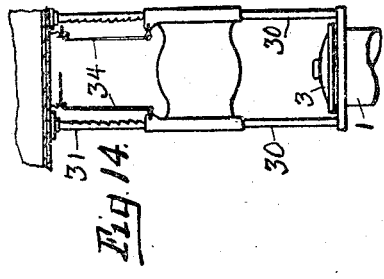
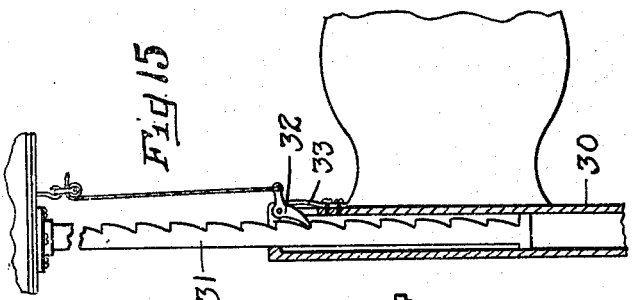
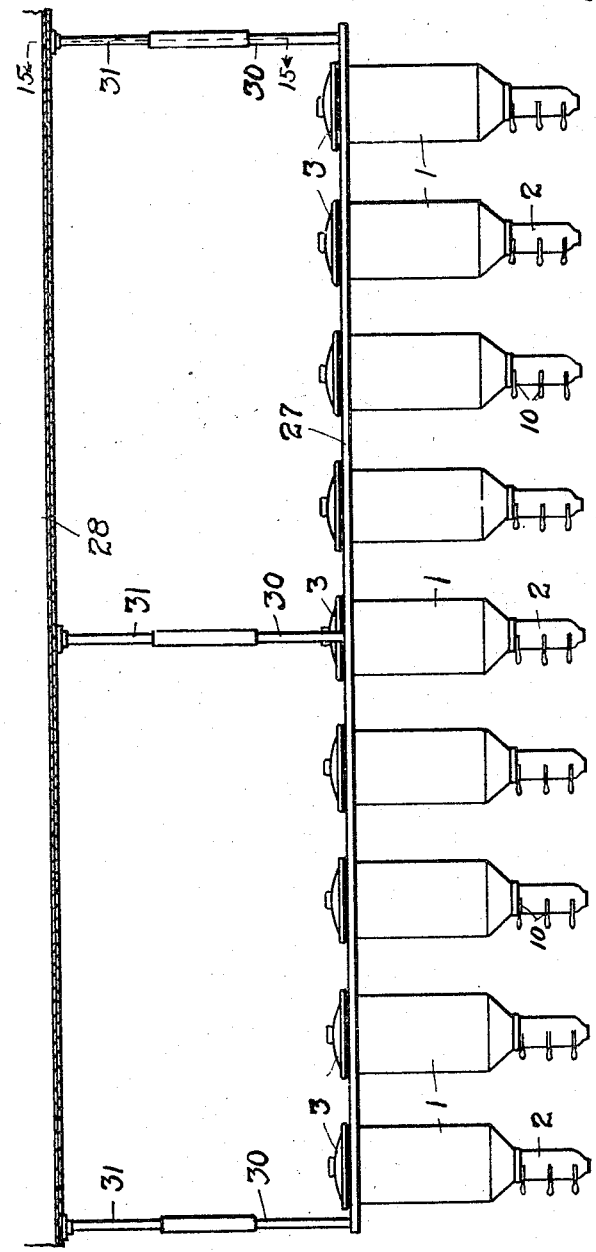

Patented Dec. 2, 1924.

1,517,923

UNITED STATES PATENT OFFICE.

ARTHUR J. SYLVESTER, OF NEW YORK, N. Y.

DISPENSING AND MEASURING APPARATUS.

Application filed February 9, 1924. Serial No. 691,680.

*To all whom it may concern:*

Be it known that I, ARTHUR J. SYLVESTER, a citizen of the United States, residing at 4043 Edson Avenue, in the borough of Manhattan, city and State of New York, have invented certain new and useful Improvements in Dispensing and Measuring Apparatus, of which the following is a specification.

My invention relates to dispensing and measuring apparatus and more particularly to an apparatus of this character for dispensing granular material, such as rice, sugar, coffee, beans and other commodities sold in retail grocery stores.

One of the objects of the invention is to provide a sanitary, dust-proof, dispensing and measuring apparatus, which will save time in supplying the customer, at the same time giving him an amount of the article corresponding accurately to a given weight.

Another object of the invention is to provide means located within the container permitting adjustments to be made in the capacity of the container to compensate for variations in the amount of contents due to climatic changes, at the same time preserving the dust-proof quality of the apparatus.

Another object of the invention is to provide means for avoiding clogging of the slots thru which the gates pass and to provide means for effectively supplying the material to the different compartments.

With the above and other objects in view my invention consists in the parts, improvements and combinations more fully pointed out hereinafter.

Referring to the drawings:

Figure 1 shows in front elevation a complete unit of the apparatus.

Figure 2 is a rear elevation of the same, with the cover in section.

Figure 3 is a vertical sectional view of the measuring chamber on line 3—3 of Figure 4.

Figure 4 is a vertical sectional view of the measuring chamber shown in Fig. 3 on line 4—4 of Fig. 1.

Figure 5 is a transverse section on line 5—5 of Fig. 4.

Figure 6 is a transverse section on line 6—6 of Fig. 1, showing the gate closed in full lines and open in dotted lines.

Figure 7 is a front elevation of the compensating slide.

Figure 8 is a side view partly in section of the slide.

Figures 9, 10 and 11 are detailed views of the adjusting screw for the compensating slide, and of the dust-proof guard for the middle gate slot.

Figure 12 is a plan view of the gate.

Figure 13 is a front elevation showing a series of the containers arranged in a rack for holding them above and behind the counter.

And Figures 14 and 15 illustrate details partly in section, for adjusting the rack vertically.

In the drawings the container comprises a hopper 1 which is preferably of glass, so that the contents may be readily visible and a metallic measuring chamber 2. The hopper is provided with a removable cover 3 and may carry any suitable designation on its face as at 4. The hopper is connected to the measuring chamber by funnel 5, to the mouth of which the measuring chamber is secured by means of a flange 6 forming part of the measuring chamber, the flange fitting and being pressed into a groove around the mouth of the funnel, so as to form a sanitary joint.

The measuring chamber is divided into a plurality of compartments preferably two in number, so that each compartment will hold for example one half pound of the material being dispensed. The upper compartment may be cut off from the hopper by means of a gate 10. The gate is provided with a wing 11, which, when the gate is pushed home into the chamber, helps to support the gate at one side by resting upon the wall of the chamber below the slot. A stop 12 is carried by the gate to limit its inward motion. The cut off portion 13 of the gate enters a notched recess in the compensating member, this also affording a support.

The gate is pivoted at 14, preferably to the outside of the measuring chamber and is urged inward by a spring 15.

As it is more usual to sell material in pound lots than in half-pounds, means are provided for closing the middle slot, and leaving its gate open in the position shown in dotted lines in Figure 6. These means may be varied. As illustrated, I provide a guard 16 (see Figures 10 and 11) preferably of semi-circular form made of felt or similar material and provided with a supporting band 17. Screws may pass thru screw holes 18 so as to secure the guard to the inside of the casing.

The upper, the middle and the lower gate are each pivoted on a pin 20 mounted upon the outside of the casing, the upper and lower gates being provided with springs for closing them as shown and the middle gate being preferably left without a spring so that it may remain open when the guard is used for its slot.

Means are provided for directing the material inwardly when filling the compartments and for preventing the material from filling each compartment close to the edge of the slot thru which the gate passes. The space at the top of each compartment immediately adjacent to the wall of the chamber and to the slot for the gate is thus left unfilled, the corresponding edge of the top of the pile of material sloping slightly toward the sides. The gate when entering the slot passes thru the free space before striking the pile. This improves the dividing action of the gate and also avoids dragging material back thru the slot by the gate. As indicated in the drawings, the mouth of the hopper is of smaller diameter than the measuring chamber so as to pile the material away from the inside of the measuring chamber at the top. I also make use of an inwardly projecting circumferential flange 21 to prevent material from reaching the top of the measuring chamber along the inner edge. The flange is provided with a shoulder or ledge 22, extending inwardly from the wall of the chamber, the inner wall of the flange being shaped as at 23 to guide the material inwardly, and the ledge acting to prevent material from going beneath it. With the upper compartment the inward guiding is performed by the neck of the hopper.

Means are provided for compensating for variations in the amount of the contents in each compartment due to the kind or condition of the article to be measured, at the same time preserving the dust-proof character of the receptacle. As illustrated, I provide an adjustable bar 24 for the purpose, having an upper and a lower portion and with a slot 24ª in the middle, the slot receiving the middle gate. Adjusting means such as screws 25 are provided which enter apertures in the wall of the measuring chamber, the screws engaging screw-threaded perforations in the bar. The bar slides in ways 26 so that as the screws are turned, the bar may be adjusted as desired. The bar being encased in a housing or slide chamber within the casing, the device is dust-proof.

The units of the measuring and distributing devices are made in sets, nine units being shown (see Figure 13), a set being mounted upon a rack 27, which may be adjusted vertically toward and from the ceiling block or bracket 28. The upper end of the container is preferably provided with a flange 29, so as to rest upon the rack, the units passing thru the rack openings.

In the form illustrated, the adjusting means for vertically adjusting the rack comprise arms 30 attached to the rack and arms 31 attached to the ceiling block. The arms 31 are made in the form of ratchet bars, pawls 32 attached to the rods 30 and spring-pressed by spring 33 into engagement with the ratchet, supporting the rack in its vertically adjusted position. Means such as flexible cords 34 attached to the pawls may be used to release the pawls when adjusting the racks.

Having thus described the invention, its operation will be clear. Changes may be made in the construction without departing from the principle of the invention.

What I claim and desire to secure by Letters Patent is:

1. A dispensing and measuring apparatus for granular material and the like, comprising in combination a transparent, glass hopper with funnel shaped mouth and a cylindrical metallic measuring chamber secured thereto, the inside of the hopper mouth being smaller than the measuring chamber, the outside of the mouth of said hopper being provided with a groove and said chamber carrying a flange integral with the chamber casing and engaging said groove, thereby enabling the hopper and chamber to be sanitarily connected.

2. A dispensing and measuring apparatus for granular material comprising in combination a hopper with funnel shaped mouth, a cylindrical measuring chamber secured thereto, said chamber provided at its top adjacent to the mouth of the hopper with a circumferential flange extending inwardly of the wall of the chamber, said chamber having a slot adjacent to and beneath said flange and carrying a pivoted gate which enters said slot, and separates the material between the hopper and the measuring chamber.

3. A dispensing and measuring apparatus for granular material comprising in combination a hopper, a cylindrical measuring chamber secured thereto, said chamber being provided with a plurality of slots and carrying a plurality of gates cooperating with said slots for dividing the material in the chamber into predetermined amounts, said chamber being also provided with a plurality of circumferentially inwardly projecting flanges, one above each slot, the inward projection of the flanges avoiding access of material to the spaces directly below them.

4. A dispensing and measuring apparatus for granular material comprising in combination a hopper, a cylindrical measuring chamber secured thereto, said chamber being provided with three slots and provided with means for carrying three gates, one above the other, cooperating respectively with said slots, a curved guard for closing the intermediate slot, said guard being composed of flexible material and means for securing said guard to the inside of the measuring chamber so as to fit said slot.

5. A dispensing and measuring apparatus for granular material comprising in combination a hopper, a cylindrical measuring chamber secured thereto, said chamber provided with three slots, one above the other, three gates cooperating respectively with said slots, a single pivot pin carried by the outside of said measuring chamber upon which single pivot pin each of said gates is freely pivoted, spring for the top and bottom gates tending to close the same, the middle gate being without a spring permitting it to remain open when desired.

6. A dispensing and measuring apparatus for granular material comprising in combination a hopper, a measuring chamber, coaxial with said hopper and secured thereto, said chamber having an enclosing casing, an inwardly projecting slide-way within the casing, an adjustable bar mounted within the slide-way, means carried by the casing for adjusting the bar, and a pair of cut-off gates cooperating with the casing for closing and sealing it, thus permitting compensation for variations in the amount of the contents at the same time preserving the dust-proof character of the apparatus.

7. A dispensing and measuring apparatus for granular material comprising in combination a cylindrical hopper, a measuring chamber, coaxial with said hopper and secured thereto, said chamber having an enclosing casing, an inwardly projecting slide-way within the casing, an adjustable bar mounted within the slide-way, a screw carried by said casing and passing thru the wall thereof for adjusting said bar, and a pair of cut-off gates cooperating with the casing for closing and sealing it, thus permitting compensation for variations in the amount of the contents at the same time preserving the dust-proof character of the apparatus.

8. A dispensing and measuring apparatus for granular material comprising in combination, a hopper, a measuring chamber secured thereto, said chamber being provided with a gate dividing it into an upper and lower measuring compartment and having an enclosing casing, a right-angled slide-way within the casing, an adjustable bar mounted within and fitting the slide-way, said bar being slotted to receive the said gate when closed.

9. A dispensing and measuring apparatus for granular material comprising in combination a hopper, a coaxial measuring chamber secured thereto, said chamber having an enclosing casing and being sub-divided into an upper and a lower measuring compartment, a slide-way within the casing and an adjustable bar mounted within the slide-way, a pair of adjusting screws passing thru the casing into the upper and lower portion respectively of said bar, and a pair of cut-off gates, one above and the other below the said bar, thus permitting compensation for variations in the amount of the contents at the same time preerving the dust-proof character of the apparatus.

In testimony whereof, I have signed my name to this specification.

ARTHUR J. SYLVESTER.